United States Patent
Grant et al.

(10) Patent No.: US 9,900,720 B2
(45) Date of Patent: Feb. 20, 2018

(54) USING SINGLE BITSTREAM TO PRODUCE TAILORED AUDIO DEVICE MIXES

(71) Applicant: DOLBY LABORATORIES LICENSING CORPORATION, San Francisco, CA (US)

(72) Inventors: Michael Grant, San Francisco, CA (US); Timothy Addy, Hampshire (GB); Michael Hoffmann, Pacifica, CA (US); Sachin Nanda, San Francsisco, CA (US)

(73) Assignees: Dolby Laboratories Licensing Corporation, San Francisco, CA (US); Dolby International AB, Amsterdam (NL)

( * ) Notice: Subject to any disclaimer, the term of this patent is extended or adjusted under 35 U.S.C. 154(b) by 0 days.

(21) Appl. No.: 14/779,391

(22) PCT Filed: Mar. 25, 2014

(86) PCT No.: PCT/US2014/031740
§ 371 (c)(1),
(2) Date: Sep. 23, 2015

(87) PCT Pub. No.: WO2014/160717
PCT Pub. Date: Oct. 2, 2014

(65) Prior Publication Data
US 2016/0066116 A1    Mar. 3, 2016

Related U.S. Application Data

(60) Provisional application No. 61/806,318, filed on Mar. 28, 2013.

(51) Int. Cl.
*H04S 3/00* (2006.01)
*H04H 20/89* (2008.01)
(Continued)

(52) U.S. Cl.
CPC ............. *H04S 3/002* (2013.01); *H04H 20/89* (2013.01); *H04N 21/8113* (2013.01);
(Continued)

(58) Field of Classification Search
None
See application file for complete search history.

(56) References Cited

U.S. PATENT DOCUMENTS 8,165,321 B2    4/2012  Paquier
8,487,176 B1 *  7/2013  Wieder ................ G10H 1/0025
                                                            84/615
(Continued)

FOREIGN PATENT DOCUMENTS

CN    101414462    4/2009
KR    10-0891667   4/2009
(Continued)

OTHER PUBLICATIONS

Beach, Andy, "Preprocessing: how real movie magic is made." p. 1. May 5, 2008. http://www.peachpit.com/articles/article.aspx?p=1188137&seqNum=9.*

*Primary Examiner* — Qin Zhu

(57) ABSTRACT

Audio stems are generated to contain audio content to be mixed by recipient devices. Multiple sets of mixing instructions for multiple audio channel configurations are determined, for example, based on input of audio producers. Each set of mixing instructions is to be used for mixing the audio stems for rendering in a corresponding audio channel configuration. A bitstream is generated to carry both the audio stems and the sets of mixing instructions. A recipient device receives the bitstream as the input. The recipient device determines a specific audio channel configuration to be used for rendering the plurality of audio stems. Based on that determination, a specific set of mixing instructions is
(Continued)

retrieved from the bitstream and used to mix the audio stems.

18 Claims, 8 Drawing Sheets

(51) Int. Cl.
  *H04N 21/854* (2011.01)
  *H04N 21/81* (2011.01)
(52) U.S. Cl.
  CPC ........ *H04N 21/85406* (2013.01); *H04S 3/004* (2013.01); *H04S 2400/01* (2013.01); *H04S 2400/03* (2013.01)

(56) References Cited

U.S. PATENT DOCUMENTS

| | | | |
|---|---|---|---|
| 2007/0297624 A1* | 12/2007 | Gilman | G10L 19/008 381/119 |
| 2010/0017002 A1 | 1/2010 | Oh | |
| 2010/0189281 A1* | 7/2010 | Oh | G10L 19/008 381/94.1 |
| 2010/0299151 A1 | 11/2010 | Soroka | |
| 2011/0166867 A1 | 7/2011 | Seo | |
| 2011/0195388 A1* | 8/2011 | Henshall | G09B 5/062 434/317 |
| 2011/0264456 A1* | 10/2011 | Koppens | G10L 19/008 704/500 |
| 2012/0057715 A1 | 3/2012 | Johnston | |
| 2013/0272525 A1 | 10/2013 | Joo | |
| 2014/0270181 A1* | 9/2014 | Siciliano | G11B 27/038 381/17 |
| 2014/0270263 A1* | 9/2014 | Fejzo | G10H 1/125 381/119 |

FOREIGN PATENT DOCUMENTS

| | | |
|---|---|---|
| KR | 2010-0096537 | 9/2010 |
| WO | 2007/130995 | 11/2007 |
| WO | 2012/125855 | 9/2012 |
| WO | 2013/006338 | 1/2013 |

\* cited by examiner

USING SINGLE BITSTREAM TO PRODUCE TAILORED AUDIO DEVICE MIXES

CROSS-REFERENCE TO RELATED APPLICATIONS

This application claims priority from U.S. Provisional Patent Application No. 61/806,318 filed 28 Mar. 2013, which is hereby incorporated by reference in its entirety.

TECHNOLOGY

The present invention relates generally to media processing systems, and in particular, to using a single bitstream to produce tailored device mixes.

BACKGROUND

Before audio content is broadcasted or distributed to recipient media devices, the audio content typically has already been mixed to target a specific audio channel configuration (e.g., of a home theater). Under this approach, the mixed audio content has specific audio data encoded beforehand for each audio channel (e.g., left, right, center, etc.) of the targeted audio channel configuration, irrespective of whether an actual recipient media device has the targeted audio channel configuration or not.

However, a recipient media device such as a phone, tablet, laptop, desktop computer, another electronic media device, etc., may have an audio channel configuration vastly different from the targeted audio channel configuration. Since the audio content has already been irreversibly mixed for the targeted audio channel configuration, the perceived quality of the audio content as rendered in the actual audio channel configuration can be severely compromised.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
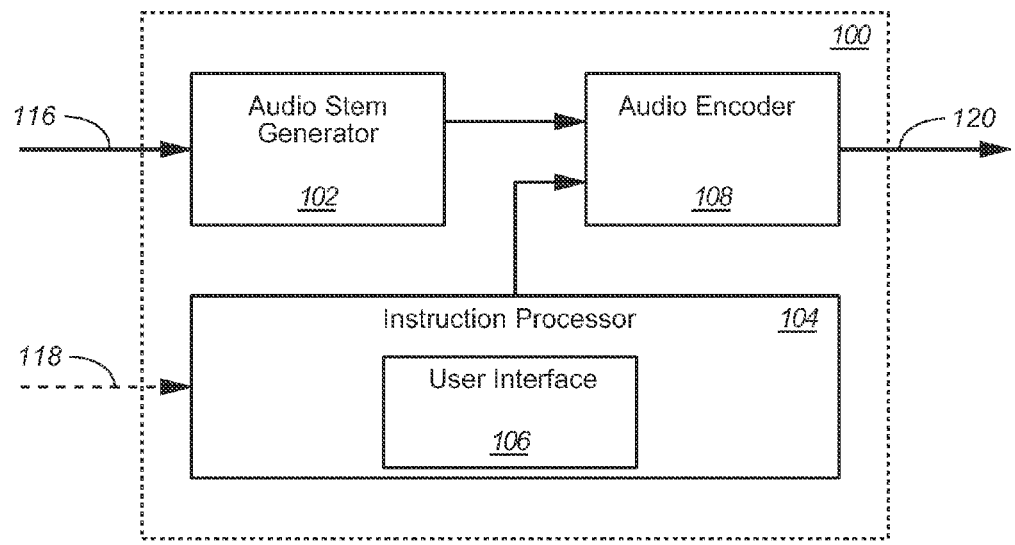
FIG. 1A and FIG. 1B illustrate example media encoding system and media decoding system, respectively.

Example embodiments, which relate to using a single bitstream to produce tailored device mixes, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MEDIA PROCESSING SYSTEMS
3. AUDIO CHANNEL CONFIGURATIONS
4. MIXING AND RENDERING AUDIO CONTENT IN MULTIPLE CONFIGURATIONS
5. GENERATION AND DISTRIBUTION OF AUDIO STEMS AND INSTRUCTIONS
6. EXAMPLE PROCESS FLOW
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques for using a single bitstream to produce tailored device mixes are described.

One or more audio producers (or content creators) can manipulate audio stems and craft a plurality of target mixes of the audio stems for a plurality of audio channel configurations (corresponding to different types of media devices rather than solely for television/home theater) in a pre-release production studio setting. Input from the audio producers can be captured and represented as a plurality of sets of mixing instructions. Each set of mixing instructions enables a recipient device to generate a mix of the audio stems for the recipient device's audio channel configuration. As used herein, the term "audio channel configuration" refers to a configuration of audio channels or audio speakers with (e.g., spatial, physical, acoustic, frequency response, etc.) characteristics specific to a device or a device type.

In contrast to other approaches under which audio content have been mixed in advance, before content distribution, to target a specific audio channel configuration, under techniques as described herein, unmixed audio data such as audio stems (e.g., dialogue, music, effects, etc.) and mixing instructions are distributed or broadcasted to recipient devices so that the recipient devices can create their respective final mixes on their own. For example, instead of receiving a bitstream with encoded data for audio channels (e.g., Left, Right, Center, etc.) as in the other approaches, a recipient device under techniques as described herein can receive a media data bitstream (e.g., encoded with Dolby Digital Plus technologies developed by Dolby Laboratories, Inc. of San Francisco, Calif., etc.), decode the bitstream, retrieve the audio stems and a suitable set of mixing instructions appropriate for the recipient device from the bitstream, mix the audio stems into a device-specific final mix based on the set of mixing instructions locally at the recipient device, and generate audio data to drive audio channels based on the device-specific final mix.

Additionally or optionally, pre-processing and/or post-processing instructions for a plurality of audio channel configurations can also be provided as a part of a media data bitstream that encapsulates the audio stems and the plurality of sets of mixing instructions.

Instructions for mixing, pre-processing, and/or post-processing may be provided as a part of metadata (e.g., encapsulated in one or more structures in a media data bitstream, etc.) separate from media sample data (e.g., encapsulated in one or more other structures in a media data bitstream, etc.) that may be used to carry the audio stems. Existing or new fields may be defined or specified for media data containers or media data bitstreams to support the carriage of some or all of these instructions. As used herein, the term "instructions" refers to separate and different data from media sample data (e.g., video frames, audio frames or PCM audio samples containing media content, etc.) that represents media content. This association of instructions (e.g., mixing instructions, etc.) with the media data can be, but is not limited to:time-synchronous, etc.

In some embodiments, an audio stem may comprise one or more audio tracks. As used herein, the term "audio track" refers to an input unit of audio data with one or more distinguishing sound characteristics. The audio tracks may respectively capture individual audio recordings (or signals) relating to one or more of: microphones, instruments, persons, dialogs, music, background sound, different types of sound emitters, etc. An audio producer can select and manipulate a variety of audio tracks and/or audio stems to generate instructions for mixing, pre-processing, post-processing, etc., in recipient media devices.

In some embodiments, mechanisms as described herein form a part of a media processing system, including but not limited to: a handheld device, game machine, television, home theater system, tablet, mobile device, laptop computer, netbook computer, cellular radiotelephone, electronic book reader, point of sale terminal, desktop computer, computer workstation, computer kiosk, various other kinds of terminals and media processing units, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Media Processing Systems

FIG. 1A illustrates an example media encoding system 100. The media encoding system 100 may comprise an audio stem generator 102, an instruction processor 104 and an audio encoder 108.

In some embodiments, the audio stem generator (102) is configured to receive audio content 116. The audio content may be provided as a plurality of audio tracks. The audio stem generator (102) can be configured to generate, based on the audio content (116), a plurality of audio stems. An audio stem represents an audio data component that is independent of any audio channel configuration and that can be rendered by sounds emitted from any of a wide variety of audio channel configurations. An audio stem may be rendered with sounds emitted from one or more audio channels in an audio channel configuration and may be individually manipulated in each of the one or more audio channels independent of other audio stems. The same audio channel configuration may be used to render one, two or more audio stems. Examples of audio stems include but are not limited to: dialogue, music, sound effects, etc. Examples of manipulations of sounds to render an individual audio stem in accordance with received instructions include but are not limited to: audio processing, channel mapping, gain adjustments, equalizing, fading, balancing, mixing including down-mixing and up-mixing, signal processing, stem mastering, noise reduction processing, etc. In some embodiments, an audio stem may comprise one or more audio tracks derived from the audio content (216).

In some embodiments, the instruction processor (104) comprises a user interface 106 configured to receive user input (118) that can be used to generate mixing instructions, post-processing operation instructions, etc. Additionally, optionally, or alternatively, the media encoding system (100) can be configured to receive data to generate some or all of the mixing instructions, post-processing operation instructions, etc. Such data can be received from other devices or units in addition to, or instead of, a user (e.g., an audio engineer, audio producer, an audio artist, etc.) who interacts with the user interface (106).

The instruction processor (104) can be configured to determine or define a plurality of sets of mixing instructions for mixing the audio stems, as generated by the media encoding system (100), on a plurality of audio channel configurations. Each set in the plurality of sets of mixing instructions comprises mixing instructions for an audio channel configuration in the plurality of audio channel configurations. Several example instructions such as example mixing instructions, etc., are shown in the following table:

TABLE 1

| Mixing Instruction | Description |
| --- | --- |
| Channel mapping | Mapping from audio stems to channels |
| Stem/channel gain | A gain value to be applied to each mapping from audio stems to channels |
| EQ | Equalization filter setting to be applied to each audio stem. |
| Reverb | Control parameters for a "reverb" effects device. Parameter may include but are not limited to:<br>on/off<br>convolution characteristics<br>reverberation time |
| Echo | Control parameters for an "echo" effects device. Parameters may include but are not limited to:<br>on/off<br>delay time<br>echo level |
| Compression | Control parameters for a dynamic range compression device. Parameters may include but are not limited to:<br>on/off<br>compression ratios<br>compression knee points<br>gains<br>time constants |

The audio encoder (108) can be configured to receive the audio stems from the audio stem generator (102) and the plurality of sets of mixing instructions from the instruction processor (104) and to encode the audio stems and the sets of mixing instructions into a media data bitstream (120) or at least a portion of such a bitstream.

Additionally and/or optionally, in some embodiments, the instruction processor (104) can be configured to process input data to determine or define a plurality of sets of post-processing instructions for performing post-processing operations on the plurality of audio channel configurations. Each set in the plurality of sets of post-processing instructions comprises post-processing instructions for an audio channel configuration in the plurality of audio channel configurations.

Additionally and/or optionally, in some embodiments, the audio encoder (108) can be configured to further receive a plurality of sets of pre-processing instructions from the instruction processor (104) and to encode the sets of pre-processing instructions with the audio stems and the sets of mixing instructions into the media data bitstream (120).

Figure 1B:
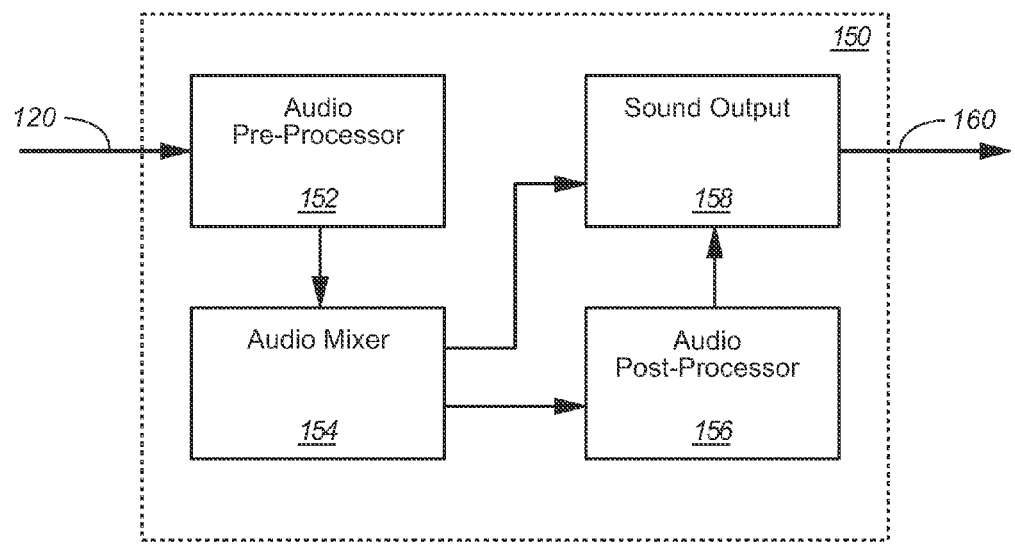

FIG. 1B illustrates an example media decoding system 150. The media decoding system 150 may comprise an audio pre-processor 152, an audio mixer 154, an audio post-processor 156, and a sound output 158.

In some embodiments, the audio pre-processor (152) is configured to receive a media data bitstream (e.g., 120), and decode at least a portion of the bitstream (120) into a plurality of audio stems. In some embodiments, the media decoding system (152) is configured to determine an audio channel configuration that is to be used to render the plurality of audio stems. Based on the determined audio channel configuration, the media decoding system (152) is configured to decode or retrieve a set of mixing instructions from the bitstream (120).

In some embodiments, the audio mixer (154) is configured to perform operations on the audio stems based on the set of mixing instructions, thereby generating a final audio mix of the audio stems.

In some embodiments, the sound output (158) is configured to generate (e.g., multi-channel, etc.) channel-specific audio data (160) for the determined audio channel configuration based on the final audio mix. The multi-channel channel-specific audio data (160) may be used to drive speakers, headphones, etc., represented in the audio channel configuration.

Additionally and/or optionally, in some embodiments, the media decoding system (150) can be configured to decode or retrieve a set of post-processing instructions from the bitstream (120), based on the determined audio channel configuration. In these embodiments, the audio post-processor (156) can be configured to perform one or more post-processing operations on the final audio mix based on the set of post-processing instructions. The final audio mix, after the post-processing operations are performed, can be provided to the sound output (158) for generating the multi-channel channel-specific audio data (160) in the audio channel configuration.

Additionally and/or optionally, in some embodiments, the media decoding system (150) can be configured to decode or retrieve a set of pre-processing instructions from the bitstream (120), based on the determined audio channel configuration. In these embodiments, the audio post-processor (156) can be configured to perform one or more pre-processing operations in relation to the audio stems based on the set of post-processing instructions.

Any of the components depicted (e.g., FIG. 1A, FIG. 1B, etc.) may be implemented as one or more processes and/or one or more IC circuits (e.g., ASICs, FPGAs, etc.), in hardware, software, or a combination of hardware and software.

A media data bitstream (e.g., 120) as described herein can be a part of an overall video bitstream (e.g., for a video program or broadcast, etc.). The media data bitstream can be accessed from a server, a computer, a media storage device, a media database, a media file, etc. The media data bit stream may be broadcasted, transmitted or received through one or more wireless or wired network links. A media data bitstream may also be communicated through an intermediary such as one or more of network connections, USB connections, wide area networks, local area networks, wireless connections, optical connections, buses, crossbar connections, serial connections, etc.

Techniques as described herein can be used to concurrently carry mixing instructions and other types of instructions for a variety of audio channel configurations corresponding to a variety of different surround sound configurations (e.g., 2.0, 3.0, 4.0, 4.1, 4.1, 5.1, 6.1, 7.1, 7.2, 10.2, etc.). A recipient device of a particular audio channel configuration can obtain specific mixing instructions suitable for the particular audio channel configuration to mix audio stems into a final audio mix optimized for the particular audio channel configuration. Additionally and/or optionally, post-processing and/or pre-processing operations can be performed based on specific post-processing and/or pre-processing instructions received with the audio stems that are device-specific for the particular audio channel configuration.

3. Audio Channel Configurations

Figure 2A:
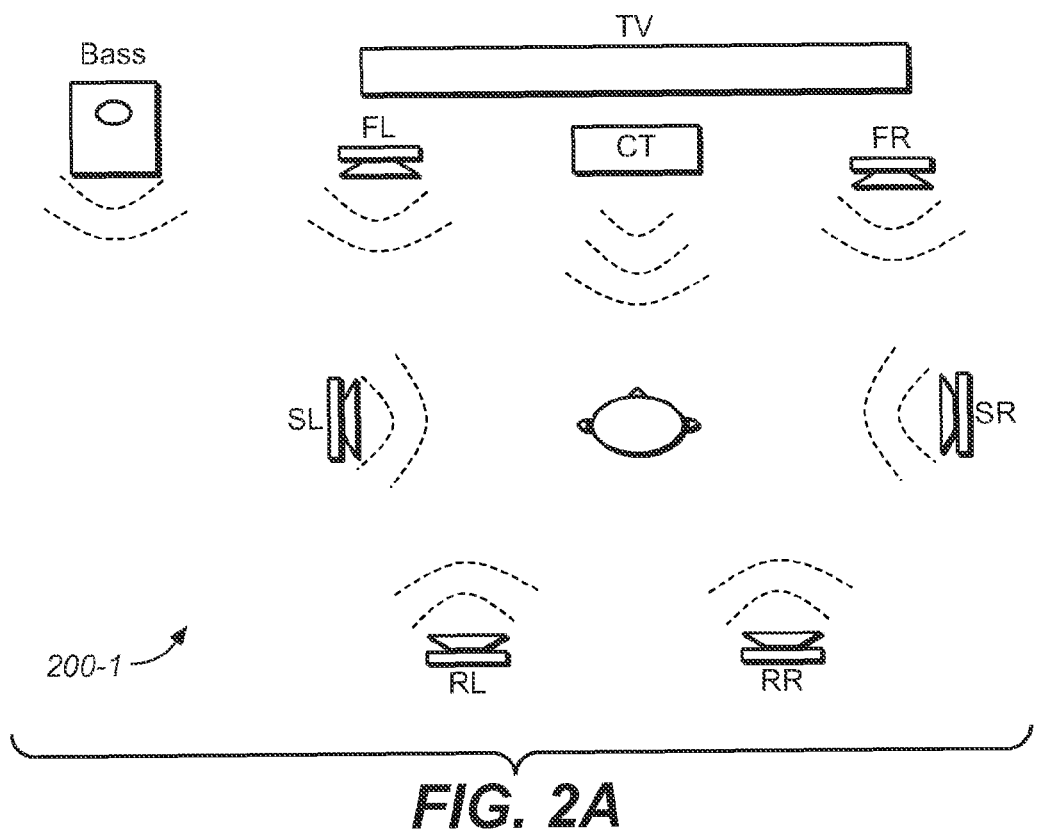
FIG. 2A through FIG. 2C illustrate example audio channel configurations.
Figure 2B:
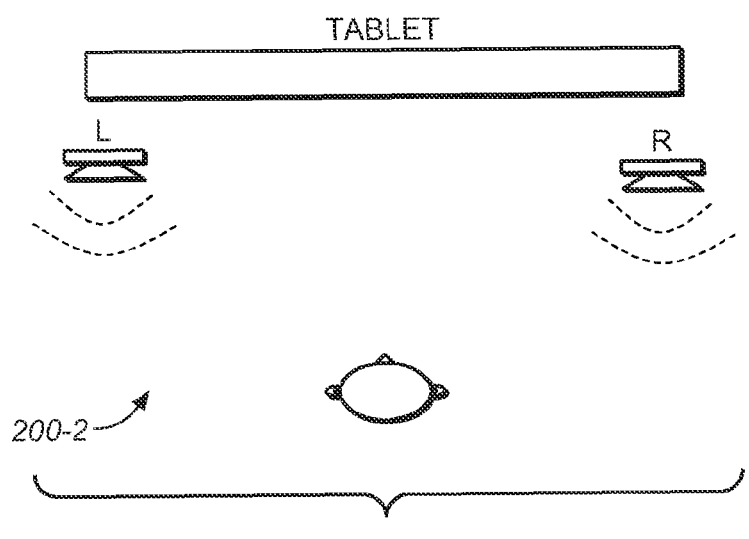
Figure 2C:
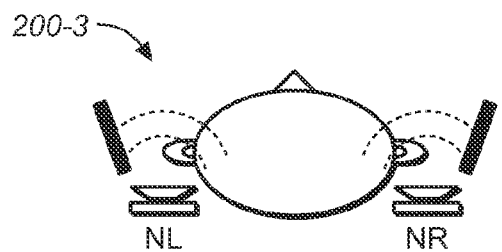

FIG. 2A through FIG. 2C illustrate example audio channel configurations. A first audio channel configuration as shown in FIG. 2A is that (e.g., surround sound specification 7.1, etc.) of a home theater and comprises a center channel (CT), a front-left channel (FL), a front-right channel (FR), a rear-left channel (RL), a rear-right channel (RR), a surround-left channel (SL), a surround-right channel (SR), and a bass channel (BA). A second audio channel configuration as shown in FIG. 2B is that of a tablet computer and comprises a left channel (L) and a right channel (FR). A third audio channel configuration as shown in FIG. 2C is that of a headset and comprises a near-field left channel (NL) and a near-field right channel (NR). It should be noted that other audio channel configurations with more or fewer audio channels and/or different types of speakers (e.g., directional, non-directional, etc.) and/or speaker spatial configurations may be used in various embodiments. An audio channel as described herein may correspond to at least one audio speaker that is driven by audio data encoded for the audio channel.

4. Mixing And Rendering Audio Content In Multiple Configurations

FIG. 3A through FIG. 3F illustrate device-specific audio mixing and rendering operations in a variety of audio channel configurations (e.g., 200-1 of FIG. 2A, 200-2 of FIG. 2B, 200-3 of FIG. 2C, etc.) with a single media data bitstream. In some embodiments, a media encoding system (e.g., 100 of FIG. 1A, etc.) formats and encodes data items contained in one or more example media data containers 300 into a media data bitstream (e.g., 120 of FIG. 1A, etc.). The data items in the media data containers (300) may include, but are not limited to any of: a plurality of audio stems (e.g., 302-1, 302-2, etc.), a plurality of sets (304-1, 304-2, 304-3, etc.) of mixing instructions, optionally a plurality of sets (e.g., 310-1, 310-2, 310-3, etc.) of post-processing instructions, or optionally a plurality of sets (not shown) of pre-processing instructions.

In some embodiments, recipient devices receive the bitstream (120) encoded with the data items in the media data containers (300 of FIG. 3A), decodes/retrieves some or all of the data items from the bitstream (120), and performs mixing operations and post-processing operations in accordance with respective sets of instructions for respective audio channel configurations (e.g., 200-1 of FIG. 2A, 200-2 of FIG. 2B, 200-3 of FIG. 2C, etc.) of the recipient devices.

Figure 3A:
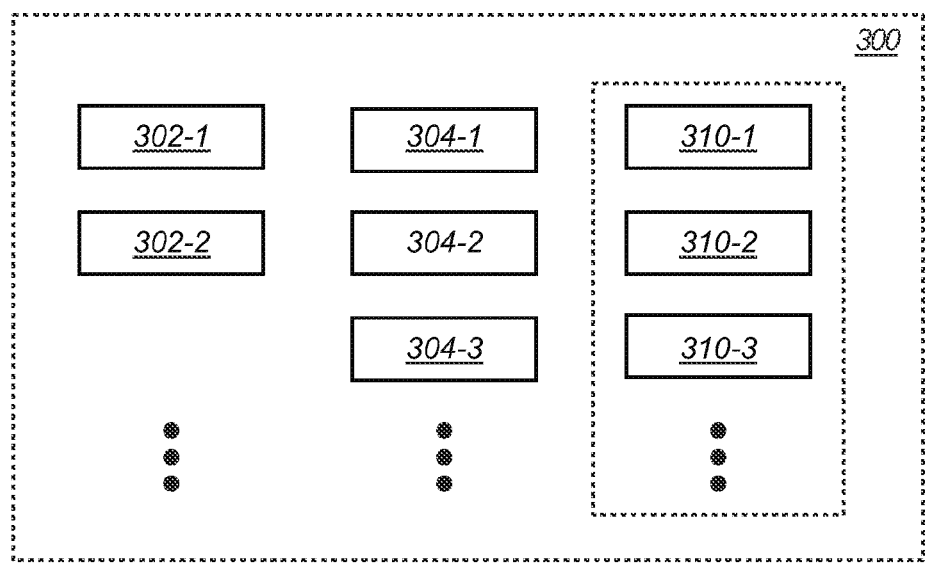
FIG. 3A through FIG. 3F illustrate device-specific audio mixing and rendering in a variety of audio channel configurations.
Figure 3B:
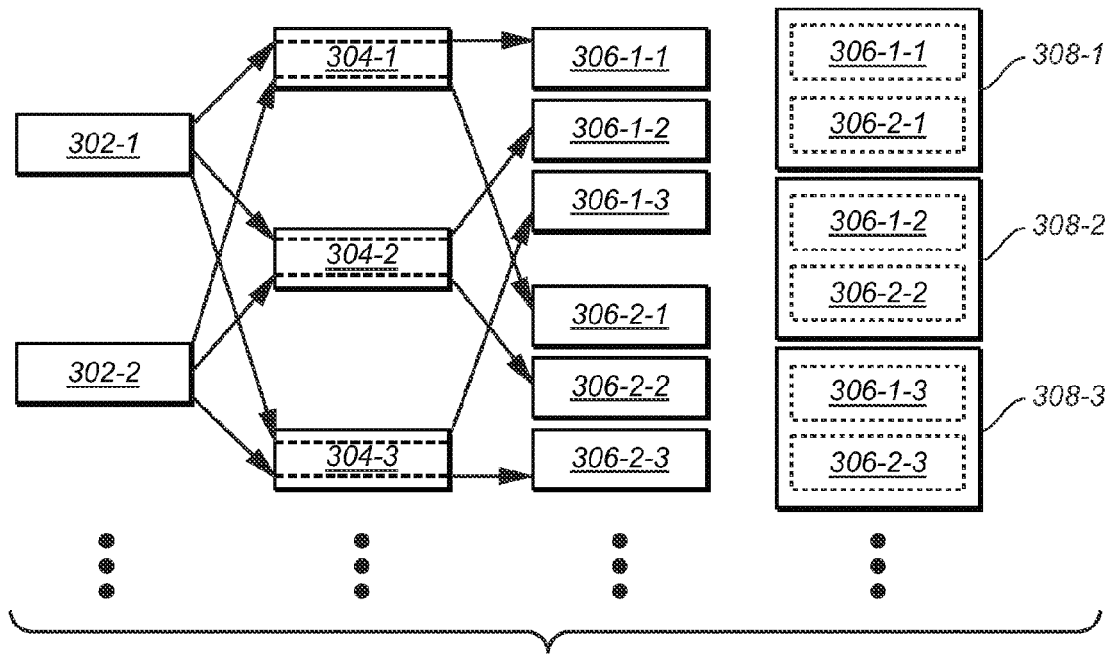

For example, a first recipient device (e.g., 150 of FIG. 1B, etc.) may be configured to retrieve, from the bitstream (120), some or all of a plurality of audio stems (e.g., 302-1, 302-2, etc.) and a first set (e.g., 304-1, etc.) of mixing instructions specifically designated for a first audio channel configuration (e.g., 200-1 of FIG. 2A, etc.) with which the recipient device (150) operates. The first set (304-1) of mixing instructions comprise first mixing instructions for a first audio stem (302-1) in the plurality of audio stems, second mixing instructions for a second audio stem (302-1) in the plurality of audio stems, etc. As illustrated in FIG. 3B, based on the first mixing instructions for the first audio stem (302-1) in the plurality of audio stems, the first recipient device is configured to generate a first submix (306-1-1) of the first audio stem (302-1). Similarly, based on the second mixing instructions for the second audio stem (302-2) in the plurality of audio stems, the first recipient device is configured to generate a second submix (306-2-1) of the second audio stem (302-2). This may be repeated to generate additional submixes if more audio stems exist in the plurality of audio stems. After the first set (304-1) of mixing instructions is applied to the plurality of audio stems, a first final mix (308-1) that comprises the submixes of the plurality of audio stems is generated. As illustrated in FIG. 3D, the first final mix (308-1) comprises audio channel data (314-CT, 314-FL, 314-FR, 314-SL, 314-SR, 314-RL, 314-RR, and 314-RR) to drive each channel or audio speaker in a plurality of channels or audio speakers (CT, FL, FR, SL, SR, RL, RR, and RR) in the first audio channel configuration (200-1 of FIG. 2A).

A second recipient device (e.g., 150 of FIG. 1B, etc.) maybe configured to retrieve, from the bitstream (120), some or all of a plurality of audio stems (e.g., 302-1, 302-2, etc.) and a second set (e.g., 304-2, etc.) of mixing instructions specifically designated for a second audio channel configuration (e.g., 200-2 of FIG. 2B, etc.) with which the recipient device (150) operates. The second set (304-2) of mixing instructions comprise third mixing instructions for the first audio stem (302-1) in the plurality of audio stems, fourth mixing instructions for the second audio stem (302-1) in the plurality of audio stems, etc. Based on the third mixing instructions for the first audio stem (302-1) in the plurality of audio stems, the second recipient device is configured to generate a third submix (306-1-2) of the first audio stem (302-1). Similarly, based on the fourth mixing instructions for the second audio stem (302-2) in the plurality of audio stems, the second recipient device is configured to generate a fourth submix (306-2-2) of the second audio stem (302-2). This may be repeated to generate additional submixes if more audio stems exist in the plurality of audio stems. After the second set (304-2) of mixing instructions is applied to the plurality of audio stems, a second final mix (308-2) that comprises the submixes of the plurality of audio stems is generated. As illustrated in FIG. 3E, the second final mix (308-2) comprises audio channel data (314-L and 314-R) to drive each channel or audio speaker in a plurality of channels or audio speakers (L and R) in the second audio channel configuration (200-2 of FIG. 2B).

A third recipient device (e.g., 150 of FIG. 1B, etc.) may be configured to retrieve, from the bitstream (120), some or all of a plurality of audio stems (e.g., 302-1, 302-2, etc.) and a third set (e.g., 304-3, etc.) of mixing instructions specifically designated for a third audio channel configuration (e.g., 200-3 of FIG. 2B, etc.) with which the recipient device (150) operates. The third set (304-3) of mixing instructions comprise fifth mixing instructions for the first audio stem (302-1) in the plurality of audio stems, sixth mixing instructions for the second audio stem (302-1) in the plurality of audio stems, etc. Based on the fifth mixing instructions for the first audio stem (302-1) in the plurality of audio stems, the third recipient device is configured to generate a fifth submix (306-1-3) of the first audio stem (302-1). Similarly, based on the sixth mixing instructions for the second audio stem (302-2) in the plurality of audio stems, the third recipient device is configured to generate a sixth submix (306-2-3) of the second audio stem (302-2). This may be repeated to generate additional submixes if more audio stems exist in the plurality of audio stems. After the third set (304-3) of mixing instructions is applied to the plurality of audio stems, a third final mix (308-3) that comprises the submixes of the plurality of audio stems is generated. As illustrated in FIG. 3F, the third final mix (308-3) comprises audio channel data (314-NL and 314-NR) to drive each channel or audio speaker in a plurality of channels or audio speakers (NL and NR) in the third audio channel configuration (200-3 of FIG. 2C).

For the purpose of illustration only, a mixing instruction has been illustrated as acting on a single audio stem. It should be noted that other types of mixing instructions other than those acting on a single audio stem may be used in various embodiments. For example, one or more mixing instructions may act on both the first audio stem (302-1) and the second audio stem (302-2) to create a single submix of these two audio stems. For the purpose of illustration only, a mixing instruction has been illustrated as acting in a single audio channel configuration. It should be noted that other types of mixing instructions other than those acting in a single audio channel configuration may be used in various embodiments. For example, one or more mixing instructions may be used in two or more audio channel configurations.

Additionally and/or optionally, in some embodiments, a recipient device (e.g., 150 of FIG. 1B, etc.) may be configured to retrieve, from the bitstream (120), a set (e.g., one of 310-1, 310-2, 310-3, etc.) of pre-processing instructions specifically designated for an audio channel configuration (e.g., one of 200-1 of FIG. 2A, 200-2 of FIG. 2B, 200-3 of FIG. 2C, etc.) with which the recipient device (150) operates. The recipient device is configured to perform pre-processing operations in relation to audio stems (e.g., 302-1, 302-2, etc.) before the audio stems are mixed according to mixing instructions.

Figure 3C:
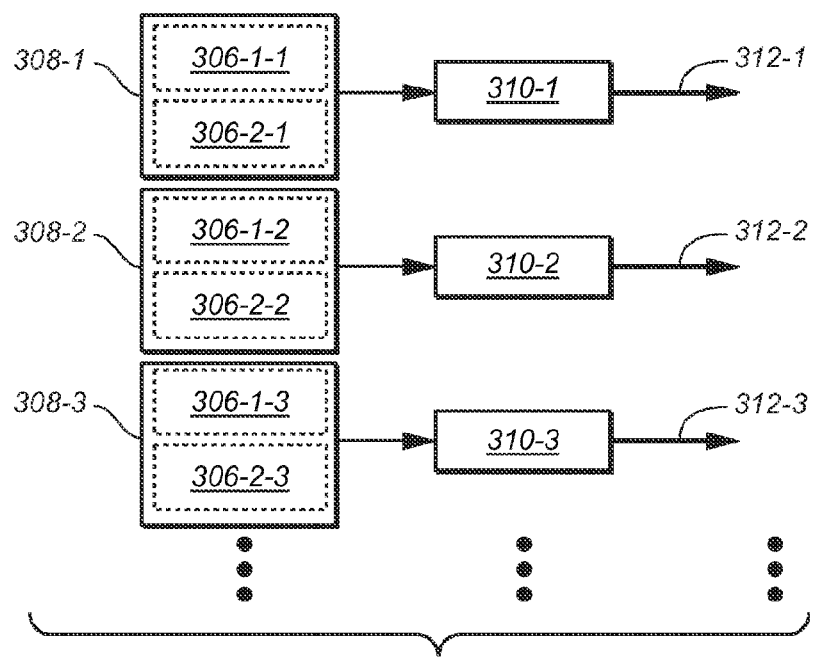
Figure 3D:
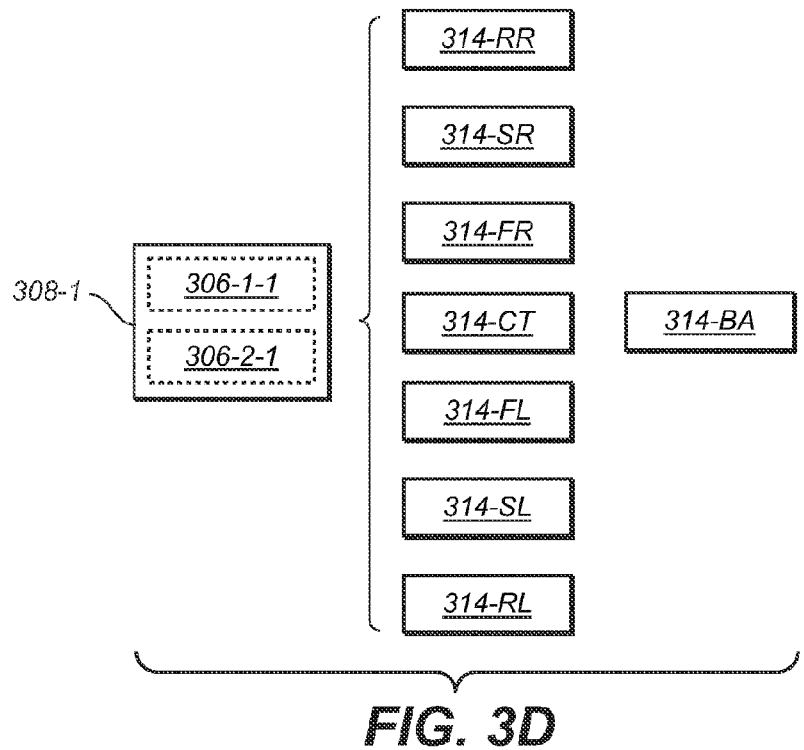
Figure 3E:
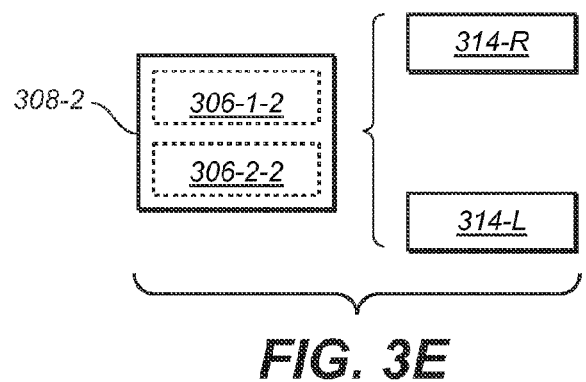
Figure 3F:
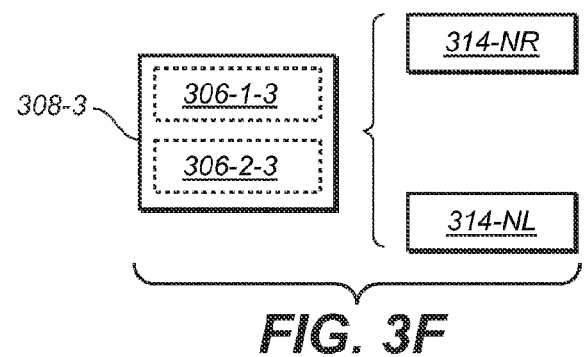

Additionally and/or optionally, in some embodiments as illustrated in FIG. 3C, a recipient device (e.g., 150 of FIG. 1B, etc.) is configured to retrieve, from the bitstream (120), a set (e.g., one of 310-1, 310-2, 310-3, etc.) of post-processing instructions specifically designated for an audio channel configuration (e.g., one of 200-1 of FIG. 2A, 200-2 of FIG. 2B, 200-3 of FIG. 2C, etc.) with which the recipient device (150) operates. The recipient device may be configured to perform post-processing operations in relation to a final mix (e.g., one of 308-1, 308-2, 308-3, etc.) as specified by the set (e.g., one of 310-1, 310-2, 310-3, etc.) of post-processing instructions. In some embodiments, a post-processed final mix (e.g., one of 312-1, 312-2, 312-3, etc.) is generated, which comprises post-processed audio channel data (e.g., similar to those illustrated in one of FIG. 3D, FIG. 3E and FIG. 3F, etc.) to drive each channel or audio speaker in a plurality of channels or audio speakers in the audio channel configuration (e.g., one of 200-1 of FIG. 2A, 200-2 of FIG. 2B, 200-3 of FIG. 2C, etc.). In some embodiments, the recipient device (e.g., 150 of FIG. 1B, etc.) is configured to perform one or more control operations on one or more system components (e.g., speakers, circuits, etc.) in the recipient device (e.g., 150 of FIG. 1B, etc.) based on the set (e.g., one f 310-1, 310-2, 310-3, etc.) of post-processing instructions as a part of rendering audio content decoded from the bitstream (120).

In some embodiments, a recipient device (e.g., 150 of FIG. 1B, etc.) does not need to decode all sets of instructions from a media data bitstream (e.g., 120, etc.). For example, the recipient device may determine its own audio channel configuration based on preconfigured information and/or runtime information, and retrieve from the media data bitstream instructions applicable to the recipient device's audio channel configuration.

In some embodiments, a media bit stream (e.g., 120, etc.) as received by a recipient device (e.g., 150 of FIG. 1B, etc.) does not have audio channel data that is already coded for each channel or audio speaker in a specific audio channel configuration and that can be rendered directly in the specific audio channel configuration. Rather, the recipient device (e.g., 150 of FIG. 1B, etc.) generates, based at least in part on audio stems and instructions for the specific audio channel configuration, audio channel data that is coded for each channel or audio speaker in a specific audio channel configuration and that can be rendered directly in the specific audio channel configuration.

In some embodiments, a media data bitstream (e.g., 120, etc.) comprises audio stems in the form of compressed audio data. The audio stems can be decoded and mixed specifically for an audio channel configuration into a final mix, which represents a stream of PCM samples. In some embodiments, at least one post-processing operation (e.g., volume leveling, bass boost, small speaker bass cut, etc.) is performed on the stream of PCM samples. A post-processing operation may implement one or more algorithms to manipulate sound output for different channels or audio speakers in an audio channel configuration. In some embodiments, at least one pre-processing operation is performed in relation to the received audio stems.

5. Generation and Distribution of Audio Stems and Instructions

Figure 4:
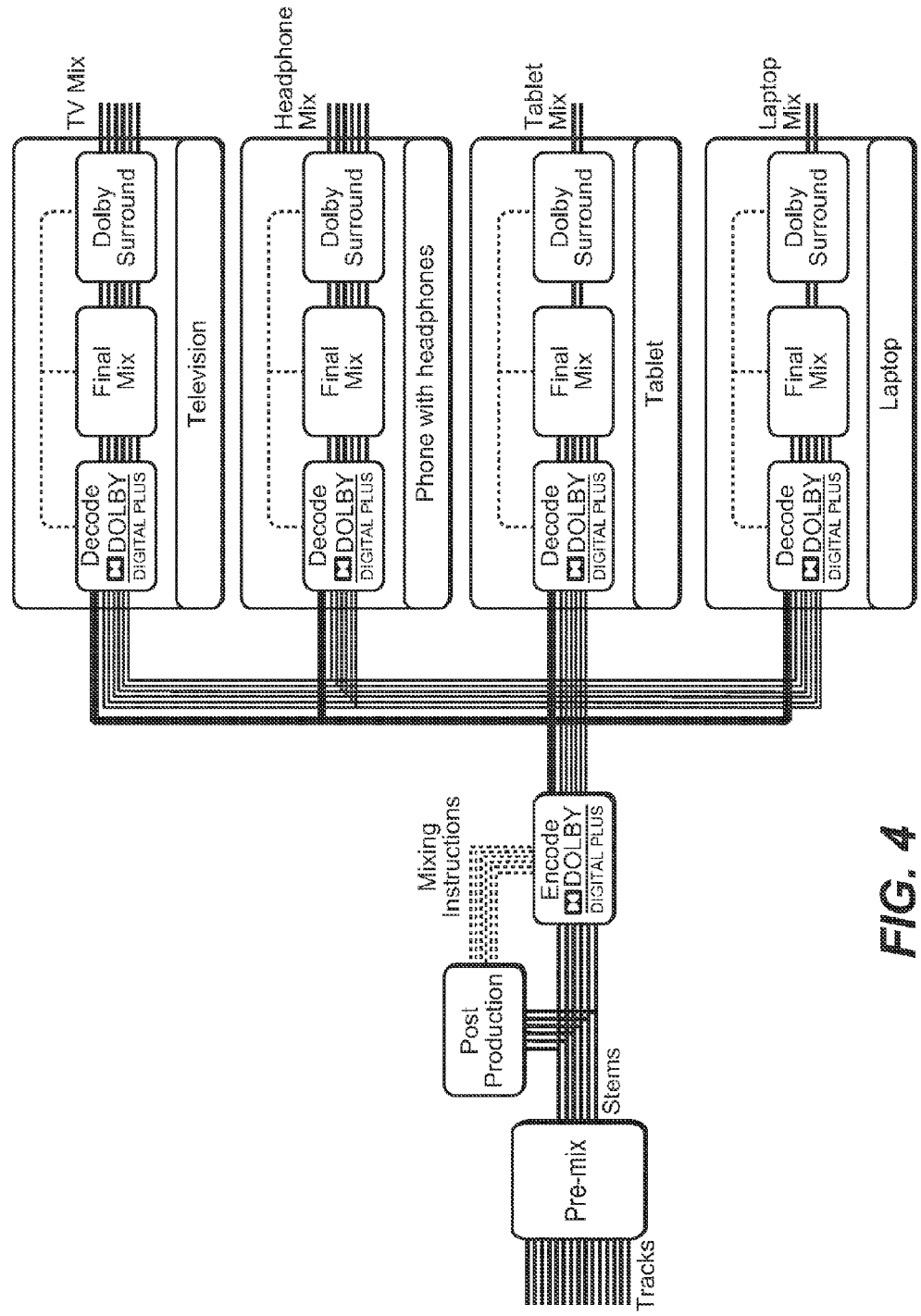
FIG. 4 illustrates example generation and distribution of audio items with device-specific instructions for a variety of audio channel configurations.

FIG. 4 illustrates example generation and distribution of audio items with device-specific instructions for a variety of audio channel configurations (e.g., 200-1 of FIG. 2A, 200-2 of FIG. 2B, 200-3 of FIG. 2C, etc.). As illustrated, audio stems can be created with audio tracks in a pre-mix stage. The creation of the audio stems is independent of which audio channel configuration audio content relating to the audio stems is to be consumed in. One or more audio producers design/mix the audio stems for each different audio channel configuration audio channel configuration in a plurality of configurations (e.g., of a TV/home theater, a phone with headphones, tablet, laptop, etc.) in a post-production stage. The input from the one or more audio producers in this stage is converted to or represented by a plurality of sets of mixing instructions, pre-processing instructions, post-processing instructions, etc. In some embodiments, some of the instructions may apply to more than one type of recipient devices. In some embodiments, some or all of the instruction may apply only to a specific type of recipient device. The audio stems and sets of instructions are encoded (e.g., with Dolby Digital Plus technologies, etc.) into a media data bitstream (e.g., 120 of FIG. 1A) for distribution or broadcast.

As illustrated in FIG. 4, a variety of types of recipient devices may receive the media data bitstream (120) encoded with the audio stems and instructions in one or more of a variety of ways (e.g., wirelessly, via a wired connection, through a file, an internet download, etc.). Any of these recipient devices may decode the media data bitstream (120) to derive the audio stems and specific instructions applicable to that recipient device. A device-specific final mix is created by the recipient device instead of preconfigured before the recipient device receives the bitstream (120). Pre-processing and/or post-processing (e.g., through Dolby Surround technologies, etc.) operations may be optionally performed on the audio stems, the device-specific final mix, system components in the recipient device, audio speakers (e.g., volume, frequency response, spatial direction, etc.) based at least in part on the specific instructions which were created under the control of the audio producers. As a result, a user receives the target mix for the user's device just as the audio producers had intended.

6. Example Process Flow

Figure 5A:
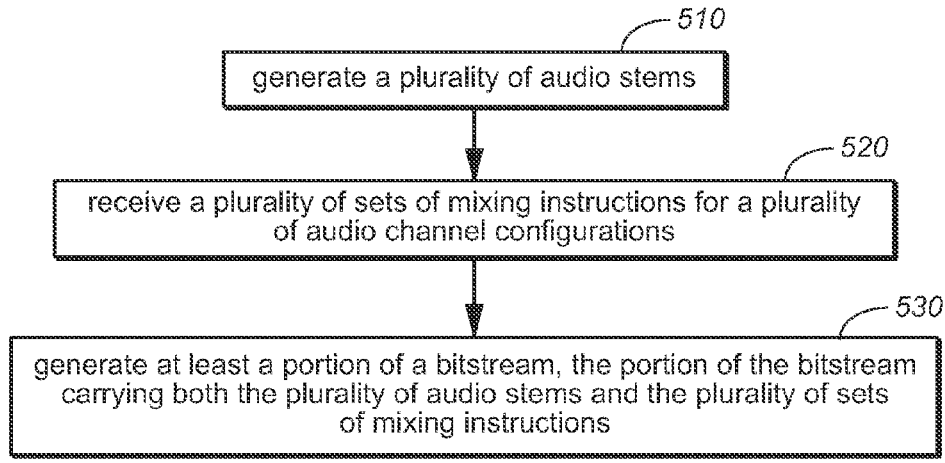
FIG. 5A and FIG. 5B illustrate example process flows.
Figure 5B:
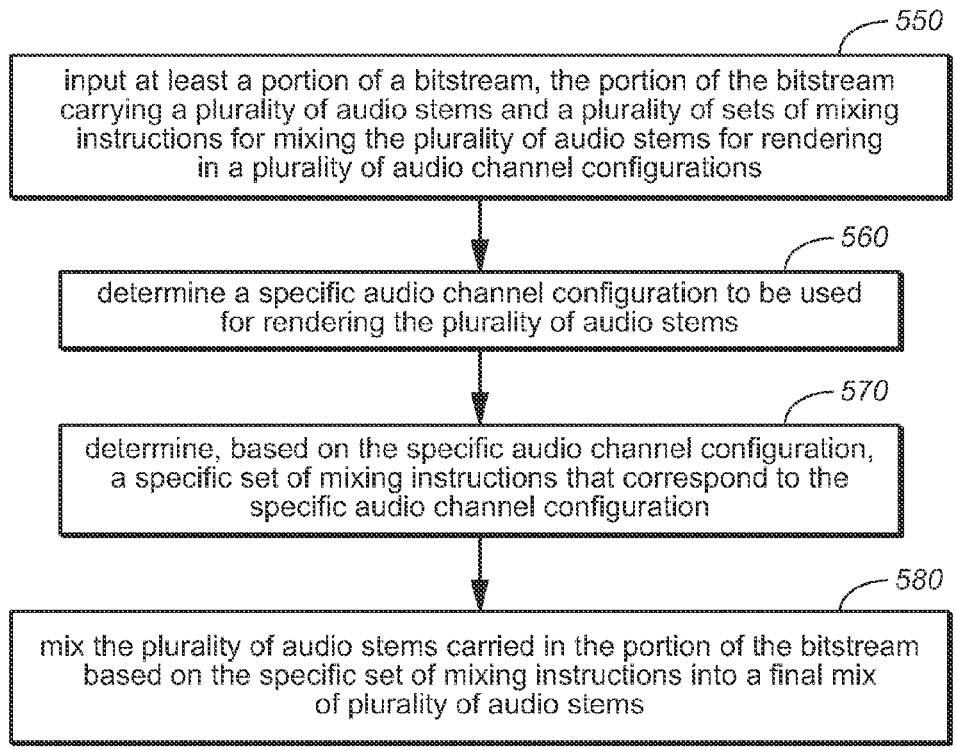

FIG. 5A and FIG. 5B illustrate example process flows. In some embodiments, one or more computing devices or units in a media processing system may perform this process flow.

In block 510 of FIG. 5A, a first device (e.g., a media encoding system 100 of FIG. 1A, etc.) generates a plurality of audio stems.

In block 520, the first device receives a plurality of sets of mixing instructions for a plurality of audio channel configurations. Each set of mixing instructions in the plurality of sets of mixing instructions is to be used for mixing the plurality of audio stems for rendering in a corresponding audio channel configuration in the plurality of audio channel configurations.

In block 530, the first device generates at least a portion of a bitstream. The portion of the bitstream carries both the plurality of audio stems and the plurality of sets of mixing instructions.

In an embodiment, the plurality of audio stems is generated based at least in part on one of premixing audio tracks, or decoding previously mixed audio data.

In an embodiment, at least one set of mixing instructions in the plurality of sets of mixing instructions is received from one of: users or audio mixing units.

In an embodiment, the first device is configured to output the portion of the bitstream to a downstream media device that supports at least one audio channel configuration in the plurality of audio channel configurations.

In block 550 of FIG. 5B, a second device (e.g., a media decoding system 150 of FIG. 1B, etc.) inputs at least a portion of a bitstream that carries the plurality of audio stems and the plurality of sets of mixing instructions for mixing the plurality of audio stems for rendering in the plurality of audio channel configurations.

In block 560, the second device determines a specific audio channel configuration to be used for rendering the plurality of audio stems.

In block 570, the second device determines, based on the specific audio channel configuration, a specific set of mixing instructions that correspond to the specific audio channel configuration.

In block 580, the second device mixes the plurality of audio stems carried in the portion of the bitstream based on the specific set of mixing instructions into a final mix of the plurality of audio stems.

In an embodiment, the second device is configured to render final mix of the plurality of audio stems. In an embodiment, the second device is configured to perform pre-processing and/or post-processing operations. In an embodiment, the bitstream does not comprise audio data encoded into a plurality of target audio channels for a target audio channel configuration.

In an embodiment, the plurality of audio stems is a part of media data comprising one or more of: audio content only, video content only, both audio content and video content, etc. In an embodiment, the portion of the bitstream further carries at least a set of instructions for post-processing operations.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
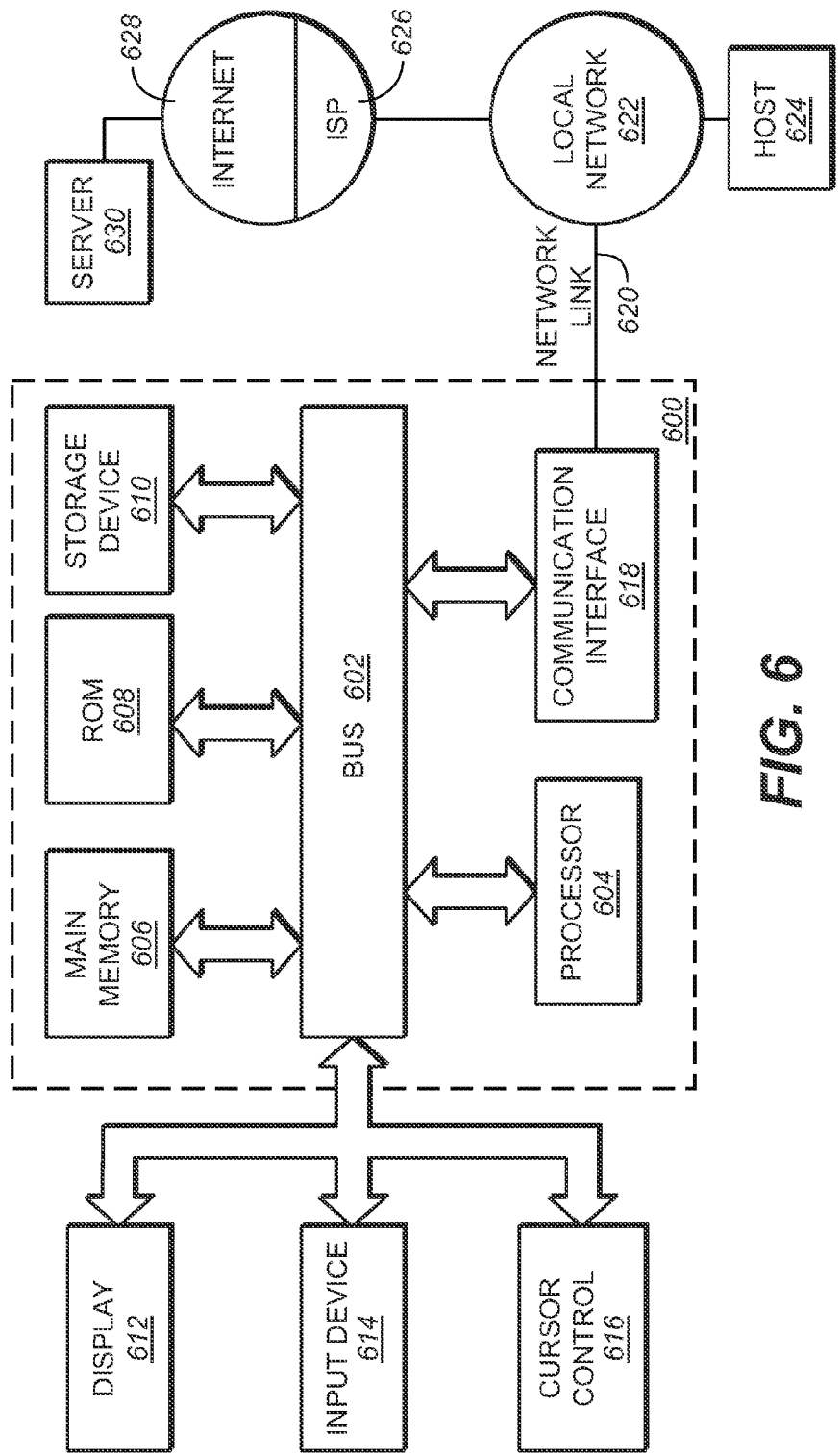
FIG. 6 illustrates an example hardware platform on which a computer or a computing device as described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is device-specific to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using device-specific hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
   generating a plurality of audio stems;
   receiving a plurality of sets of mixing instructions for a plurality of audio channel configurations, each set of mixing instructions in the plurality of sets of mixing instructions to be used for mixing the plurality of audio stems for rendering in a corresponding audio channel configuration in the plurality of audio channel configurations;
   wherein each such set of mixing instructions for the corresponding audio channel configuration comprises a mixing instruction for each audio stem in the plurality of audio stems to generate an individual submix from each such audio stem for the corresponding audio channel configuration; wherein the individual submix for each such audio stem in the plurality of audio stems is to be included in a respective final mix for the corresponding audio channel configuration; and
   generating at least a portion of a bitstream, the portion of the bitstream carrying both the plurality of audio stems and the plurality of sets of mixing instructions.

2. The method as recited in claim 1, wherein the plurality of audio stems is generated based at least in part on one of: premixing audio tracks or decoding previously mixed audio data.

3. The method as recited in claim 1, wherein at least one set of mixing instructions in the plurality of sets of mixing instructions is received from one of: users or audio mixing units.

4. The method as recited in claim 1, further comprising outputting the portion of the bitstream to a downstream media device that supports at least one audio channel configuration in the plurality of audio channel configurations.

5. The method as recited in claim 1, wherein the bitstream does not comprise audio data encoded into a plurality of target audio channels for a target audio channel configuration.

6. The method as recited in claim 1, wherein the plurality of audio stems is a part of media data comprising one or more of: audio content only, video content only, or both audio content and video content.

7. The method as recited in claim 1, wherein the portion of the bitstream further carries at least a set of instructions for post-processing operations.

8. A method, comprising:
   inputting at least a portion of a bitstream, the portion of the bitstream carrying a plurality of audio stems and a plurality of sets of mixing instructions for mixing the plurality of audio stems for rendering in a plurality of audio channel configurations;
   determining a specific audio channel configuration to be used for rendering the plurality of audio stems;
   determining, based on the specific audio channel configuration, a specific set of mixing instructions that correspond to the specific audio channel configuration; and
   mixing the plurality of audio stems carried in the portion of the bitstream based on the specific set of mixing instructions into a final mix of the plurality of audio stems;
   wherein each such set of mixing instructions for the corresponding audio channel configuration comprises a mixing instruction for each audio stem in the plurality of audio stems to generate an individual submix from each such audio stem for the corresponding audio channel configuration; wherein the individual submix for each such audio stem in the plurality of audio stems is to be included in a respective final mix for the corresponding audio channel configuration.

9. The method as recited in claim 8, wherein the bitstream does not comprise audio data encoded into a plurality of target audio channels for a target audio channel configuration.

10. The method as recited in claim 8, wherein the plurality of audio stems is a part of media data comprising one or more of: audio content only, video content only, or both audio content and video content.

11. The method as recited in claim 8, wherein the portion of the bitstream further carries at least a set of instructions for post-processing operations.

12. The method as recited in claim 8, further comprising rendering the final mix of the plurality of audio stems.

13. The method as recited in claim 9, further comprising performing pre-processing operations in relation to the plurality of audio stems.

14. The method as recited in claim 9, further comprising performing post-processing operations in relation to the plurality of audio stems.

15. A method, comprising:
   generating multiple audio stems from multiple input audio tracks;

in response to receiving user input specifying how the audio stems should be mixed in multiple target audio channel configurations, generating multiple sets of mixing instructions respectively corresponding to the multiple target audio channel configurations;

wherein each such set of mixing instructions for the corresponding audio channel configuration comprises a mixing instruction for each audio stem in the plurality of audio stems to generate an individual submix from each such audio stem for the corresponding audio channel configuration; wherein the individual submix for each such audio stem in the plurality of audio stems is to be included in a respective final mix for the corresponding audio channel configuration;

generating a media data bitstream that carries all of the multiple audio stems and the multiple sets of mixing instructions; and sending the media data bitstream to a downstream audio rendering device with any audio channel configuration of the multiple audio channel configurations to cause the downstream audio rendering device to select a set of mixing instructions, based on the audio channel configuration of the downstream audio rendering device, from the multiple sets of mixing instructions to render the multiple audio stems.

16. A media processing system configured to perform the method recited in claim 1.

17. An apparatus comprising a processor and configured to perform the method recited in claim 1.

18. A non-transitory computer readable storage medium, comprising software instructions, which when executed by one or more processors cause performance of the method recited in claim 1.

* * * * *